United States Patent
Fournier et al.

(10) Patent No.: US 10,109,117 B2
(45) Date of Patent: Oct. 23, 2018

(54) AIRCRAFT PERFORMANCE COMPUTATION

(71) Applicant: THALES, Courbevoie (FR)

(72) Inventors: François Fournier, Toulouse (FR); Heloïse Le Reun, Toulouse (FR); Marc Boyer, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/803,042

(22) Filed: Jul. 18, 2015

(65) Prior Publication Data

US 2016/0019732 A1    Jan. 21, 2016

(30) Foreign Application Priority Data

Jul. 18, 2014 (FR) ...................... 14 01621

(51) Int. Cl.
G07C 5/08      (2006.01)
G07C 5/00      (2006.01)
(Continued)

(52) U.S. Cl.
CPC ........... *G07C 5/0808* (2013.01); *B64D 45/00* (2013.01); *G01C 21/20* (2013.01); *G07C 5/00* (2013.01); *G07C 5/085* (2013.01); *G07C 5/0866* (2013.01); *G08G 5/0013* (2013.01); *G08G 5/0021* (2013.01); *G08G 5/0086* (2013.01);
(Continued)

(58) Field of Classification Search
CPC .............................. G06K 9/00; G06K 2209/03
USPC ....... 701/34.2, 400, 3–4, 14, 408–409, 32.8, 701/33.4, 11; 348/143–144; 382/103,
(Continued)

(56) References Cited

U.S. PATENT DOCUMENTS 8,650,015 B2 *  2/2014  Vialatte ................. G07C 5/085
                                                        369/21
9,030,557 B2 *  5/2015  Wende .................... H04L 12/42
                                                        348/144
(Continued)

FOREIGN PATENT DOCUMENTS

EP      2 196 775 A2    6/2010
WO      2011/114278 A2  9/2011

OTHER PUBLICATIONS

Usability of EFBs for viewing NOTAMs and AIS/MET data link messages; Evans, E.T.; Young, S.D.; Daniels, T.S.; Myer, R.R. Digital Avionics Systems Conference (DASC), 2013 IEEE/AIAA 32nd; Year: 2013; pp. 2A-1-2A2-14, DOI: 10.1109/DASC.2013.6712531.*

(Continued)

*Primary Examiner* — Cuong H Nguyen
(74) *Attorney, Agent, or Firm* — Baker & Hostetler LLP

(57) ABSTRACT

A computer implemented method of computing performance for an aircraft, comprises the steps of collecting data from a plurality of data sources comprising data sources of avionics type and external data sources of non-avionics type; processing the data collected in an electronic device of EFB or electronic flight bag type; and undertaking the performance computation. Developments describe the extraction of data from images or audio streams; the manipulation of data of alarm, INOP, aircraft status, air conditioning and anti-ice, runway, ATIS, meteorological and/or NOTAM type; the interfaces with an FPS or flight planning system and/or a CMS or centralized maintenance system. System aspects and software aspects are described.

11 Claims, 3 Drawing Sheets

(51) Int. Cl.
*G01C 21/20* (2006.01)
*G08G 5/00* (2006.01)
*B64D 45/00* (2006.01)

(52) U.S. Cl.
CPC ... *G08G 5/0091* (2013.01); *B64D 2045/0075* (2013.01); *G07C 5/008* (2013.01)

(58) Field of Classification Search
USPC ......... 382/190, 209; 345/945; 340/972, 973, 340/974, 977, 425.15; 244/75.1, 76 R
See application file for complete search history.

(56) References Cited

U.S. PATENT DOCUMENTS

| | | | | |
|---|---|---|---|---|
| 2002/0136435 | A1* | 9/2002 | Prokoski | G06K 9/00221 382/118 |
| 2003/0225487 | A1* | 12/2003 | Robert | G05D 1/0676 701/4 |
| 2005/0258942 | A1* | 11/2005 | Manasseh | G07C 5/008 340/425.5 |
| 2006/0282597 | A1* | 12/2006 | Plognnann | G01C 23/005 710/303 |
| 2007/0236366 | A1* | 10/2007 | Gur | G06K 9/00 340/945 |
| 2008/0068184 | A1* | 3/2008 | Bonefas | A61B 5/18 340/575 |
| 2010/0152924 | A1* | 6/2010 | Pandit | G01C 23/00 701/3 |
| 2010/0185362 | A1* | 7/2010 | Vialatte | G07C 5/085 701/33.4 |
| 2010/0312420 | A1* | 12/2010 | Sham | G06Q 10/00 701/3 |
| 2011/0234797 | A1* | 9/2011 | Wende | H04L 12/42 348/144 |
| 2012/0007979 | A1* | 1/2012 | Schneider | G01J 3/36 348/116 |
| 2012/0319869 | A1* | 12/2012 | Dorfmann | A61B 5/18 340/945 |
| 2013/0169541 | A1* | 7/2013 | Cabos | B64D 43/00 345/168 |
| 2014/0108947 | A1* | 4/2014 | Chatrenet | G06F 3/0488 715/740 |
| 2014/0163782 | A1* | 6/2014 | Huynh | H04L 67/1095 701/3 |
| 2014/0207314 | A1* | 7/2014 | Kou | B64D 43/00 701/14 |
| 2015/0098611 | A1* | 4/2015 | Nagino | G01N 33/5308 382/103 |
| 2015/0329217 | A1* | 11/2015 | Kirk | B64D 45/00 701/301 |
| 2016/0196698 | A1* | 7/2016 | O'Dell | G07C 5/085 701/33.4 |
| 2017/0032576 | A1* | 2/2017 | Mazoyer | G08G 5/0021 |
| 2017/0183105 | A1* | 6/2017 | Fournier | B64D 45/00 |
| 2017/0186203 | A1* | 6/2017 | Fournier | G08G 5/0013 |
| 2017/0199833 | A1* | 7/2017 | Warner | G06F 13/385 |
| 2017/0277185 | A1* | 9/2017 | Duda | B64D 45/00 |

OTHER PUBLICATIONS

Symbology evaluation for strategic weather information on the flight deck; Grasse, T.; Schilke, C.; Schiefele, J.; Digital Avionics Systems Conference, 2008. DASC 2008. IEEE/AIAA 27th; Year: 2008; pp. 4.B.1-1-4.B.1-12, DOI: 10.1109/DASC.2008.4702826.*

Rule-based NOTAM & Weather notification; Zimmer, N.; Schiefele, J.; Bayram, K.; Hankers, T.; Frank, S.; Feuerle, T.; Integrated Communications, Navigation and Surveillance Conference (ICNS), 2011; Year: 2011; pp. O1-1-O1-9, DOI: 10.1109/ICNSURV.2011.5935352.*

Electronic moving map of airport surface on electronic flight bag; Kamineni, S.; Rathinam, S.; Digital Avionics Systems Conference, 2004. DASC 04. The 23rd; Year: 2004, vol. 1; pp. 4.C.3-4.1-9 vol. 1, DOI: 10.1109/DASC.2004.1391322.*

Navaids testing risks and their mitigation; L. N. Spohnheimer; Digital Avionics Systems Conference, 2003. DASC '03. The 22nd Year: 2003, vol. 1; pp. 4.D.4-41-13 vol. 1, DOI: 10.1109/DASC.2003.1245846.*

Automated NOTAM processing for a graphical and textual integration on data link equipped aircraft; Andreas Sindlinger et al., 2010 Integrated Communications, Navigation, and Surveillance Conference Proceedings; Year: 2010; pp. G1-1-G1-9, DOI: 10.1109/ICNSURV.2010.550325.*

Video to information (V2I) system enabling old commercial cockpit instruments to participate in the advanced information retrieval and safety services; R. Hamza; W. Au; M. Johnson; T. Henderson; Proceedings. The 21st Digital Avionics Systems Conference Year: 2002, vol. 2; pp. 12C4-1-12C4-10 vol. 2, DOI: 10.1109/DASC.2002.1052991.*

SVSS: Intelligent Video Surveillance System for Aircraft, Naagaraja Thanthry, Indira P. Emmuadi, Aravind Srikumar, Kamesh Namuduri & Ravi Pendse; Wichita State University, IEEE A&E Systems Magazine, Oct. 2009 (Based on a presentation at DASC 2007).*

Using Electronic Fly Bag in an aircraft of Airworks Inc., Trademark 2005 Airworks. Inc.*

Aerodrome mapping databases supporting taxi routing functions; Christian Pschierer et al.; 2011 IEEE/AIAA 30th Digital Avionics Systems Conference; Year: 2011; pp. 8E4-1-8E4-11.*

Automated NOTAM processing for a graphical and textual integration on data link equipped aircraft Andreas Sindlinger et al.; 2010 Integrated Communications, Navigation, and Surveillance Conference Proceedings Year: 2010; pp. G1-1-G1-9.*

Electronic moving map of airport surface on electronic flight bag; S. Kamineni et al., The 23rd Digital Avionics Systems Conference (IEEE Cat. No. 04CH37576); pp. 4.C.3-4.1-9 vol. 1.*

Rule-based NOTAM & Weather notification; Nico Zimmer et al., 2011 Integrated Communications, Navigation, and Surveillance Conference Proceedings; Year: 2011; pp. O1-1-o1-9.*

* cited by examiner

AIRCRAFT PERFORMANCE COMPUTATION

CROSS-REFERENCE TO RELATED APPLICATION

This application claims priority to foreign French patent application No. FR 1401621, filed on Jul. 18, 2014, the disclosure of which is incorporated by reference in its entirety.

FIELD OF THE INVENTION

The invention relates to the field of avionics and in particular that of aircraft performance computation.

BACKGROUND

"Performance computation" for an aircraft, for example an aeroplane, refers to the set of operations consisting in computing a certain number of values required for the flight or the mission. This computation for example may comprise the determination or verification of the value of the takeoff speed, of the limit speed, of the mass on takeoff, of the runway length on takeoff or on landing, etc. The computations are performed with the aid of charts or generally with the aid of specialized onboard computers and/or software, mainly during flight or mission preparation.

In the details, as a function of the specific context associated with each aeroplane, of the airport context specific to each airport and of other flight environment variables, the input data to be used for the performance computation may differ substantially, rendering the computations complex.

The existing solutions for the establishment of the performance computation exhibit limitations, defects, sluggishness, sub-optimizations and as a corollary they increase the risks of errors.

In particular, the existing solutions require or necessitate numerous manual operations, generally laborious and needlessly tiring, on the part of the pilot. Manipulation of the documentation in paper form for example slows the operations down appreciably.

There exists a need for methods and systems improving this performance computation.

SUMMARY OF THE INVENTION

There is disclosed a computer implemented method of computing performance for an aircraft, comprising the steps consisting in collecting or receiving data from a plurality of data sources, these sources comprising data sources of avionics type and data sources of non-avionics type (for example external data sources); processing the data collected in an electronic device of EFB or electronic flight bag type; and undertaking the performance computation (properly speaking, the terminology being designated).

In a development, the step consisting in collecting data comprises a step consisting in acquiring one or more images in the cockpit of the aircraft, the said cockpit comprising one or more viewing screens, and a step consisting in extracting data from at least one image acquired in the cockpit.

For example, a screen can be a Multi Purpose Display Unit (MCDU). The extraction of data (for example textual) can be done by "scraping" (cf hereinafter). Data such as text, numerical values, positions of cursors or dial, etc. may be extracted.

In a development, the step consisting in collecting data comprises a step consisting in extracting data from an audio stream.

For example, it will be possible to undertake the recognition of speech in an audio stream, and then the transcription of this audio stream into text. This extraction from an audio stream (for example emitted by the airport) can be done as a supplement to (or in substitution for) the step of extracting data from images.

In a development, the collected data comprise one or more data of alarm, INOP, aircraft status, air conditioning and anti-ice, runway, ATIS, meteorological and/or NOTAM type.

In a development, the processing step comprises one or more operations from among operations of interpretation, filtering and conversion of data.

In a development, the avionics data sources are transmitted by the interface equipment of the aircraft from data arising from an FPS (or "Flight Planning System") and/or a CMS (or "Centralized Maintenance System").

In a development, the external data sources are transmitted by one or more ground servers and the external data comprising meteorological and/or NOTAM notices type data.

In a development, the external data sources furthermore comprise data arising from the Internet network (for example, local meteorological data).

In a development, the operation of interpreting the collected data is performed by means of an avionics protocols model.

In a development, the operation of converting the collected data is performed by means of a predefined conversion file.

In a development, the step consisting in undertaking the performance computation is preceded by the reception of a correction or of the validation of one or more items of data by the pilot for the performance computation.

There is disclosed a computer program product, the said computer program comprising code instructions making it possible to perform the steps of the method according to any one of the steps of the method, when the said program is executed on a computer.

There is disclosed a system comprising means for implementing one or more steps of the method.

According to one aspect of the invention, the various data relevant to the performance computation are advantageously centralized (notably the data regarding aircraft status, alarms, weather, NOTAM, weight, runway, weight, ATIS).

According to another aspect of the invention, the data are distributed and verified in an appropriate manner: the relevant data are selected and processed to optimize the computation of performance.

Advantageously, embodiments optimize the cognitive burden of the pilot, the latter being unburdened of a certain number of laborious tasks and being able conversely to concentrate on intellectual tasks that are more critical to the flight. For example, the tasks of identification and management by the pilot of the specific context of a flight are eased (the data allowing the computation are searched for and integrated into the performance computation).

Advantageously, embodiments establish a direct link between the performance computation function and the various data associated with the aircraft context, with the airport context and with the context of the flight environment.

Advantageously, the solution makes it possible to take into account directly the information regarding aircraft context or alarms, the airport information and the weather information and to rapidly indicate to the pilot the appropriate input data for his computations.

Advantageously, the pilot decreases his data input burden and can concentrate solely on the verification of the data.

According to one aspect of the invention, the security and the integrity of the data are advantageously managed. Certain embodiments indeed make it possible to effect a gateway or an advantageous articulation between a rather more "open" environment, that is to say one that is not certified (e.g. EFB, Flight Planning System) and a rather more "closed" avionics environment, that is to say one that is certified and regulated (FMS, interface equipment).

BRIEF DESCRIPTION OF THE FIGURES

Various aspects and advantages of the invention will become apparent in support of the description of a preferred but nonlimiting mode of implementation of the invention, with reference to the figures hereinbelow.

DETAILED DESCRIPTION

Figure 1:
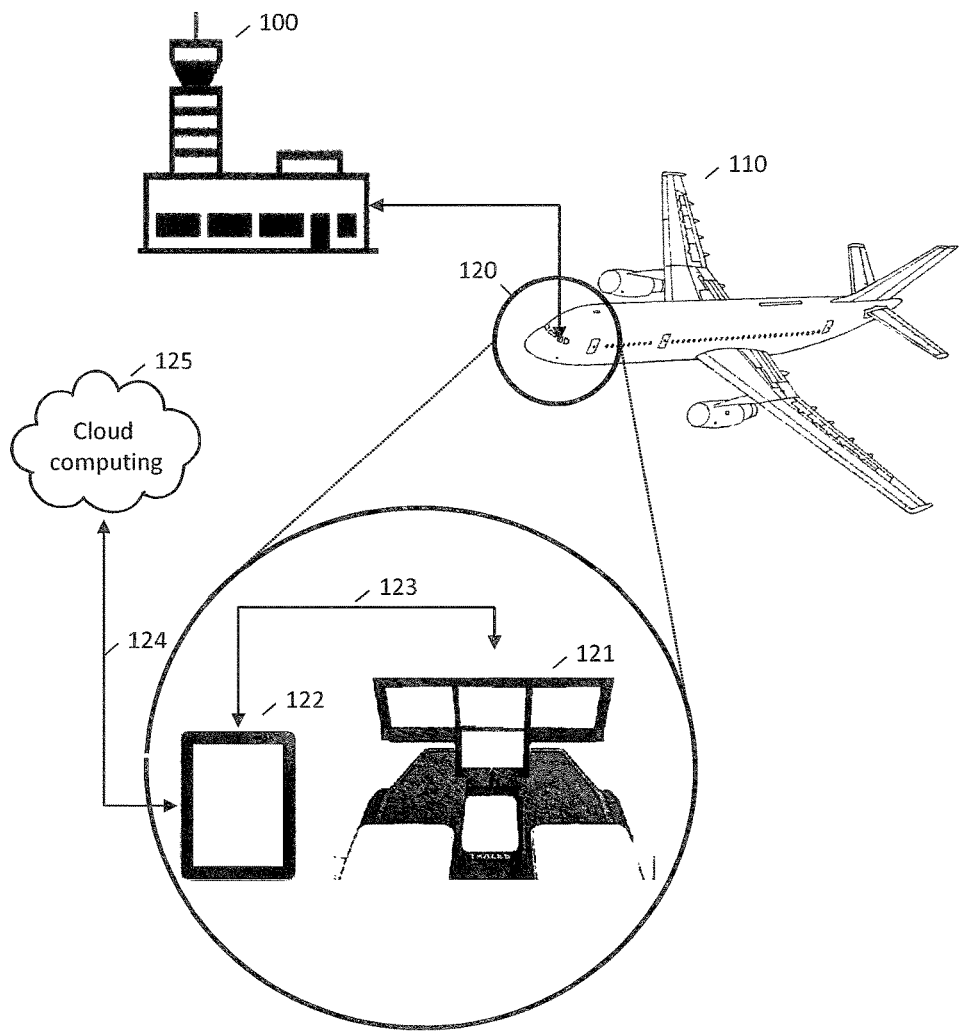
FIG. 1 illustrates the global technical environment of the invention.

Certain technical terms and environments are defined hereinafter.

An "Electronic Flight Bag" with acronym or initials EFB corresponds to or refers to onboard electronic libraries. An electronic flight bag (or electronic flight tablet) EFB is a portable electronic facility used by flight personnel (for example pilots, maintenance or cabin staff etc.). An EFB can provide the crew with flight information, helping them to perform tasks (with less paper). In practice, it generally entails an off-the-shelf computer tablet. One or more applications allow the management of information for flight management tasks. These general-purpose computing platforms are intended to reduce or replace the reference material in paper form, often found in the hand luggage of the "Pilot Flight Bag" and whose manipulation may be laborious. The reference paper documentation generally comprises the flight manuals, the various navigation maps and the ground operations manuals. This documentation is advantageously rendered paperless in an EFB. Furthermore, an EFB can host software applications specially designed to automate operations conducted manually in normal time, such as for example takeoff performance computations (computation of limit speed, etc.). Various classes of EFB hardware exist. Class 1 EFBs are portable electronic facilities (PEDs), which are normally not used during takeoff and the disembarkation operations. This class of facility does not require an administrative process of particular certification or authorization. EFB facilities of class 2 are normally disposed in the cockpit, e.g. mounted in a position where they are used in all the flight phases. This class of facilities requires prior authorization of use. Class 1 and 2 facilities are considered to be portable electronic facilities. Fixed installations of class 3, such as computing media or fixed docking stations installed in the cockpit of aircraft, generally demand the approval and a certification on the part of the regulator.

The acronym (or initials) FMS corresponds to the terminology "Flight Management System" and refers to the "flight management system" of an aircraft. In particular, the acronym refers to the onboard computer. During flight preparation or during rerouting, the crew input various items of information relating to the progress of the flight, typically by using an FMS aircraft flight management facility. An FMS comprises input means and display means, as well as computation means.

The acronym (or initials) FPS corresponds to the terminology "Flight Planning System" and refers to the "flight planning system" of an aircraft. This system manages in particular the consumption of fuel and the ATC (Air Traffic Control) requirements.

The acronym MMI corresponds to Man-Machine Interface (or HMI, Human Machine Interface). The inputting of the information and the display of the information input or computed by the display means constitute such a man-machine interface. Generally, the MMI means allow the inputting and the consultation of the flight plan information.

The term "Centralized Maintenance System", acronym CMS, refers to a centralized maintenance system, which ensures in particular the maintenance of an aircraft on the ground, which maintenance comprises various steps, comprising firstly the filling in by the onboard personnel of a flight register, or "Logbook" as it is known, listing the set of alarms, anomalies, or other events noted by the crew during the flight. The maintenance personnel have at their disposal various documentary sources, generally dispersed, and several levels of documents detailing the procedures and the various individual tasks to be undertaken. Certain alarms may have an impact on the computation of performance.

The term "NOTAM", "Notice To Airmen", refers to a type of message intended for the flight personnel. NOTAM notices are generally messages published by the air navigation check systems with the aim of informing pilots of upgrades regarding infrastructures. A NOTAM may be published in case of modification of a ground installation, for example to inform or notify a presence of obstacles (for example a crane or works zones) in proximity to an airport. More generally, a NOTAM may inform in regard to an arbitrary danger in respect of air navigation. It may also define prohibited overflight zones. The pilot must consult these messages during flight preparation.

The term "INOP" corresponds to the alarms emitted by the Flight Warning System. Certain alarms may have an impact on the performance computation.

The term "ATC", "Air Traffic Control", refers to air traffic control. Air traffic control is one of the three types of aerial traffic services. It is rendered to aircraft by air traffic controllers so as to aid the safe, fast and efficient execution of flights. It is aimed at preventing collisions between aircraft or between an aircraft and an obstacle. It also consists in speeding up and scheduling aerial traffic.

The term "ATIS", "Automatic Terminal Information Service", is an automatic service in respect of airport terminal information. This service generally provides in loop the important information about a given airport (problem of congestion, state of runway, etc.).

FIG. 1 illustrates the global technical environment of the invention. Avionics equipment or airport means 100 (for example a control tower linked with the air traffic control systems) are in communication with an aircraft 110. An aircraft is a means of transport capable of deploying within the terrestrial atmosphere. For example, an aircraft can be an aeroplane or a helicopter (or else still a drone). The aircraft comprises a flight cabin or a cockpit 120. Within the cockpit is situated piloting equipment 121 (so-called avionics equipment), comprising for example one or more onboard computers (means of computation, of saving and of storing data), including an FMS, means of display or viewing and inputting of data, communication means, as well as (optionally) haptic feedback means. An EFB 122 may be situated onboard, in a portable manner or integrated into the cockpit. The said EFB can interact (bilateral communication 123) with the avionics equipment 121. The EFB can also be in communication 124 with external computing resources, accessible by the network (for example cloud computing 125). In particular, the computations can be performed locally on the EFB or partially or totally in the computation means accessible by the network. The onboard equipment 121 is generally certified and regulated while the EFB 122 and the connected computing means 125 are generally not (or to a lesser extent). This architecture makes it possible to inject flexibility on the side of the EFB 122 by ensuring a controlled security on the side of the onboard avionics 121. Several EFBs may be on board.

Figure 2:
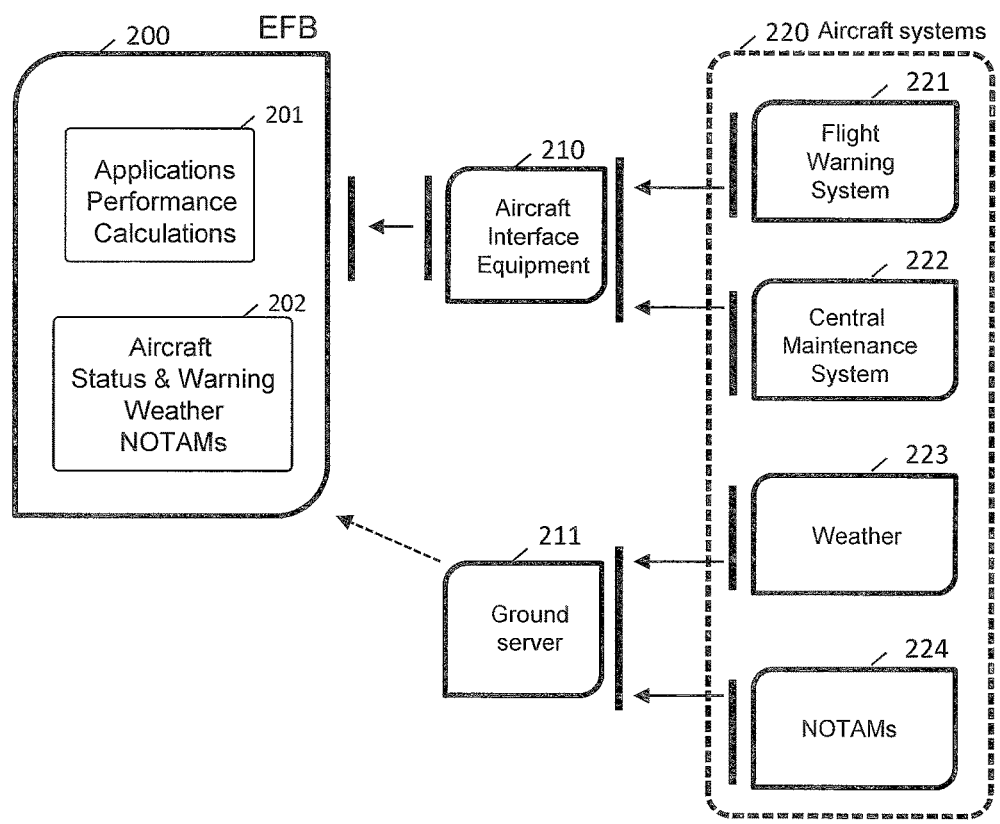
FIG. 2 presents an overall view of the method according to the invention.

FIG. 2 presents an overall view of the method according to the invention. In one embodiment, the method is implemented in all or part on one or more systems of EFB type 200. In particular, an EFB 200 can comprise an application (or function within an application) "Performance Calculations" 201, which can access or contain one or more databases 202, for example an "airport" database or an "obstacles" database.

Generally, the whole set of data can be collected/received (and processed) automatically, for example in the EFB, discharging the pilot of laborious tasks. Accordingly, two data sources are combined: the "aircraft" systems and the "ground" systems.

The EFB 200 can be linked to the "aircraft" interface equipment 210, the latter being the onboard operational systems, which can search for and/or access and/or process various sources of information (Aircraft Systems 220). These sources of information can in particular comprise:

information of "aircraft context" type, mainly via the Flight Warning System 221 function or from the viewing screens information regarding the Centralized Management System (CMS) 222.

The EFB 200 can also be linked or in communication with the airport installations, or "ground" systems, for example the servers on the ground 211. Through this channel, the EFB can retrieve additional information, so as to complete or to complement or correct or amend the information originating from the onboard operational systems:

information of meteorological type 223; on the basis of the meteorological information, the state of the runways, the wind or the temperature can be determined is taken into account in the performance computation;

information of NOTAM (Notice to Airmen) type.

For example, the aircraft status information can be amended as a function of the NOTAM information and of the meteorological information.

On the basis of the aircraft data, the "Performance Calculations" function can determine the "INOP items", and on the basis of the NOTAM information, it can determine the modifications to be made to the "obstacles" database. On the basis of the ATC data the application can determine the runway chosen to do the computation. On the basis of the digital loadsheet, the application can determine the weight of the aeroplane. On the basis of the ATIS data preprocessed on the ground or digital ATIS, the application can determine the state of the runway. The pilot can validate or correct one or more items of data or information or values or selections such as inputs for the performance computation. Once the whole set of values or information have been verified or have been validated, the performance computation can be executed or performed.

Specifically, in a particular embodiment, the "Performance Calculations" function of an application installed on the EFB retrieves the "aircraft status" and the associated alarms, the meteorological information as well as the NOTAM notices. The data are thereafter proposed to the pilot for verification and/or validation so as to undertake the performance computation properly speaking.

Concerning the mode of collection of the data 316, a particular embodiment is described hereinafter. A "scraping" operation corresponds to an extraction of information by means of the acquisition of one or more images, and of the subsequent processing of these images. The operation refers to an operation of retrieval or capture of information on a digital object, the said retrieval or capture not being originally scheduled by the digital object. For example, this retrieval of information may comprise the acquisition of one or more images and then the recognition of characters within the captured images.

An "opportunistic" information retrieval or evasion or capture operation such as this makes it possible to establish a link between certified avionics systems (that is to say inter alia controlled and regulated, rather closed, the computer security of which is comparatively more controlled or at the very least monitored) and the non-avionics systems (non-certified open systems, that are more prone to computing attacks but correlatively that evolve faster). In a noteworthy manner, the information retrieval or capture operation is unilateral: the extraction of information is performed from the avionics systems to the open systems (and not the reverse). For example, there is no injection of non-avionics data and/or programs into the avionics systems (or else in a controlled manner).

In the present avionics context, several embodiments are described. In one embodiment, the pilot or the copilot or some other member of the flight personnel triggers an acquisition of images, for example by means of the EFB electronic tablet equipped with a photographic apparatus. The snapshot is thereafter analysed, cropped, and the captured information is extracted from the image. The pre-established knowledge of the type of image captured allows specific recognition. For example, an alarm displayed on the FWS will be in a pre-established and known format. Accordingly the information capture will be optimized. In a variant, the snapshot will be of video type (that is to say acquisition of a succession of still images, the large number of captured images allowing notably optimization of the information capture and/or robustness to the movements of the user carrying the image acquisition means). According to another embodiment, the image acquisition means are mounted in a fixed manner in the cockpit of the aircraft. By this means, information capture or retrieval can be performed in a continuous manner. According to another embodiment, the image acquisition means can correspond to photographic apparatus or video cameras fixed on virtual or augmented reality headsets. Another means of extraction corresponds to extraction of data from an audio stream, by voice recognition ("speech-to-text").

In this instance, the "Alarms" information is available on the pilot's viewing screen, and is also available via the MCDU (Multi purpose display unit) disposed in the cockpit of the aircraft, for example by consulting the reports of the centralized maintenance computer. The Air Conditioning and Anti-Ice data are often buttons in the cockpit or are information available on the VDU screens of the onboard instrumentation. The data relating to the active runways (for example the direction of takeoff) is communicated in airport information called ATIS and accessible on MCDU or VDU viewing screen. The data relating to the runway and to its entry are provided by radio, that is to say in non-visual form. In this case, the extraction of data can despite everything take place by voice recognition, transcription and processing of the transcribed text data. The information relating to the weather of the runway is generally communicated in the airport information called ATIS and is accessible on MCDU or VDU viewing screen.

Figure 3:
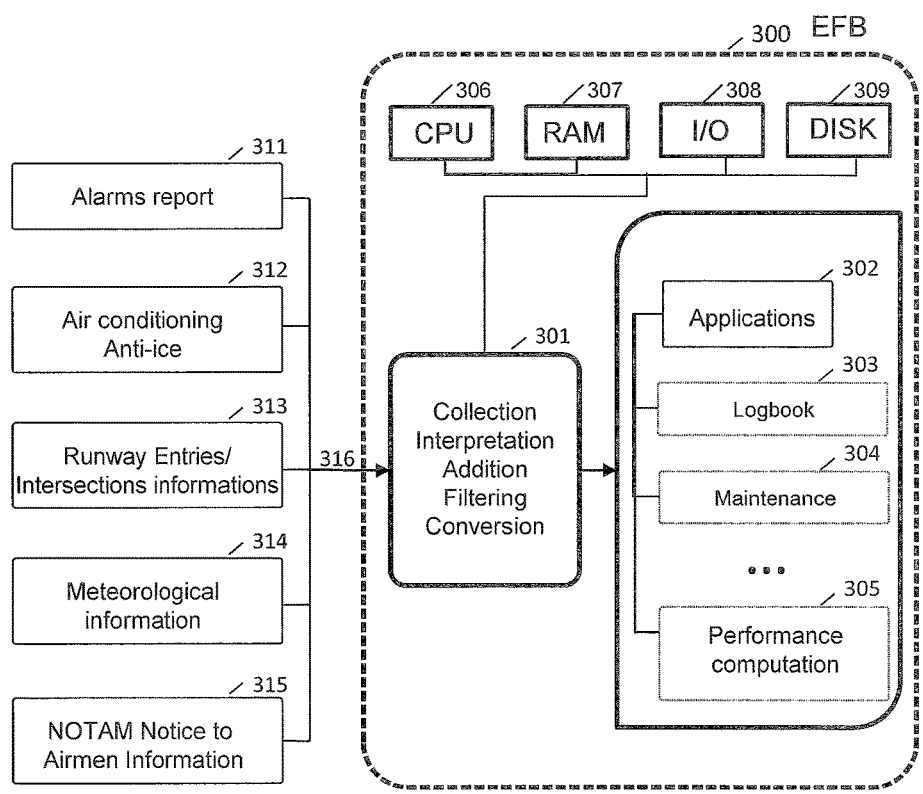
FIG. 3 details certain aspects of the method according to the invention.

FIG. 3 details certain aspects of the method according to the invention. One or more devices 300 of EFB type are in interaction with several data sources, for example aircraft alarm data 311, data relating to the air conditioning and the anti-ice systems 312, runway data of entries and intersections type 313, meteorological data 314 and NOTAM data 315. The EFB searches for and/or interprets and/or manipulates 301 these data, so as to transmit them to one or more software applications (or application functions) installed within the EFB such as for example a "Logbook" application or function 303, a "Maintenance" application or function 304, or else still—and specifically—a "Performance computation" application 305. The latter application or function conducts in all or part the operations of manipulating the data 301, which comprise (non-exhaustive list) operations of collection and/or interpretation (for example by means of avionics protocols model) and/or of addition (the EFB can supplement data) and/or of filtering and/or of conversion. Hardware-wise, these logic operations are made possible by hardware means for computation 306, random-access or non-persistent memory 307, inputs/outputs I/O 308 of network or MMI type (audio-visual input or playback peripherals) and mass storage 309. The hardware means may be implemented locally and/or via a remote access. For example, at least a part of the computation and/or storage means may be accessible by means hosted in the network ("Cloud Computing") modulo the requirements in regard to latency time, which may themselves be optimized. The traffic may be enciphered. The viewing means 308 may notably comprise one or more screens (for example touchscreens), and/or one or more projectors (including laser), and/or one or more virtual and/or augmented reality headsets, and/or one or more means of haptic feedback (e.g. force feedback), and/or securing means (e.g. fingerprint based or biometric or chip card based authentication, and/or image acquisition means (e.g. digital photographic apparatus or video camera), and/or data input means (e.g. real or virtual keyboard or voice dictation or stylus based writing recognition).

The details relating to the data processing are described hereinafter.

Concerning the processing of the "INOP items" (alarms 311), the aircraft system (Flight Warning) transmits on the avionics bus (for example A429) the report of the alarms. The aircraft interface equipment retrieves the data of the avionics bus and transmits them to the EFB (via USB or Ethernet). The EFB retrieves the data, interprets the avionics protocol and retrieves the alarms (code+message). The EFB filters the alarms having an impact on the performance computation (for example by means of a file of the alarms having an impact on the performance computation). The EFB converts the alarm data into "INOP items" data (for example by means of a file for converting the alarms, comprising a code and a message, into "INOP items"). The EFB thereafter completes the input file of the performance computation module.

Concerning the processing of the "Air Conditioning & Anti-Ice" data 312, the aircraft system transmits on the avionics bus (A429) or by discretes the status of the air conditioning and anti-ice systems. The aircraft interface equipment retrieves the data of the avionics bus and transmits them to the EFB (via USB or Ethernet). The EFB retrieves the data, interprets the avionics protocol and retrieves the statuses. The EFB converts the statuses of the aircraft systems into input status of the computation (for example by means of a file for converting the statuses). The EFB thereafter completes the input file of the performance computation module.

Concerning the processing of the runway data, two solutions can be considered. According to a first solution, the ATC or the airport or the company transmits to the aircraft systems the runway and entries/intersections information. The aircraft interface equipment retrieves the data of the avionics bus and transmits them to the EFB (via USB or Ethernet). According to a second alternative solution, the ATC or the airport or the company transmits to the ground server administering the various EFBs the runway and entries/intersections information for the company's flights. The ground server administering the EFBs then determines the EFB or EFBs concerned and transmits the data to them (for example by means of a database associating the flights with the EFBs). The EFB retrieves the data (interprets the avionics protocol if necessary) and retrieves the runway/entries/intersections information for the flight concerned. The EFB converts the alarm data into input data of the computation (for example by means of a file for converting the runway/entries/intersections information).

Concerning the processing of the meteorological data, the data can be of two categories. The "Airport Weather" data comprise for example the wind direction and speed, the temperature and the local pressure. The "Runway Weather" data for their part comprise the state of the runway (e.g. "dry", "snow"). Two solutions for collecting the data can be considered. According to a first solution, the ATC or the airport or the company transmits the weather information to the aircraft systems. The aircraft interface equipment retrieves the data of the avionics bus and transmits them to the EFB (via USB or Ethernet). According to a second solution, the ATC or the airport or the company transmits the weather information for the company's flights to the ground server administering the EFBs. The ground server administering the EFBs determines the EFB(s) concerned and transmits the data to it (them). With one or the other of the alternatives, the EFB retrieves the data (interprets the avionics protocol if necessary) and retrieves the Airport Weather and Runway information for the flight concerned. The EFB thereafter converts the Airport Weather and runway data according to the runway adopted into input data of the computation (optionally by means of Runway information "Processing of the runway data" and/or of a file for converting the weather information). The EFB finally completes the input file of the performance computation module.

Concerning the processing of the NOTAM (Notice To Airmen) data, the notices can comprise input data relating to the airport, its type, the runway, the start and the end of runway. Two solutions for collecting the data can be considered. According to a first solution, the ATC or the airport or the company transmits the NOTAM information to the aircraft systems. The aircraft interface equipment retrieves the data of the avionics bus and transmits them to the EFB (via USB or Ethernet). According to a second solution, the ATC or the airport or the company transmits the NOTAM information for the company's flights to the ground server administering the EFBs. The ground server administering the EFBs determines the EFB or EFBs concerned and transmits the data to them. With one or the other of the alternatives, the EFB retrieves the data (interprets the avionics protocol if necessary) and retrieves the NOTAM information for the flight concerned. The EFB analyses and filters the NOTAMs so as to take into account those relating to the runway adopted (for example by means of Runway Information "Processing of the runway data"). The EFB thereafter converts the NOTAM data into input data of the computation linked with the airport database used by the computation module (for example by means of an Airport database). The EFB completes the input file of the performance computation module.

The present invention can be implemented on the basis of hardware and/or software elements. It may be available in the guise of computer program product on a computer readable medium. The medium may be electronic, magnetic, optical or electromagnetic.

The invention claimed is:

1. A computer implemented method of computing performance for an aircraft, comprising:
    collecting data from a plurality of data sources including avionics type data sources and external non-avionics type data sources with an electronic flight bag (EFB) type device, wherein the step of collecting data comprises:
        a step of acquiring with an image capture device of the electronic flight bag (EFB) type device at least one image of at least one viewing screen in a cockpit of the aircraft, the cockpit having one or more viewing screens, and
        a step of extracting data from the at least one image acquired in the cockpit utilizing optical character recognition to generate extracted data with the electronic flight bag (EFB) type device;
    processing the extracted data collected in the electronic flight bag (EFB) type device; and
    performing automatically a performance computation of the extracted data for the aircraft with the electronic flight bag (EFB) type device.

2. A system for an extraction of data from one or more images acquired in a cockpit of an aircraft, said system comprising means for implementing:
    a collection of data from a plurality of data sources including avionics type data sources and external non-avionics type data sources, wherein the collection of data comprises an acquisition with an image capture device of an electronic flight bag (EFB) type device of at least one image of at least one viewing screen in the cockpit of the aircraft, the cockpit having one or more viewing screens, and an extraction of the data from the at least one image acquired in the cockpit;
    a recognition of characters within the acquired a least one image with the electronic flight bag (EFB) type device;
    a data processing system for the data collected in the electronic flight bag (EFB) type device; and
    an automatic computation of a performance of the aircraft based on a processing of the data collected by the data processing system.

3. The method according to claim 1, wherein the step of collecting data further comprising a step of extracting data from an audio stream.

4. The method according to claim 1, wherein the collected data comprising one or more data comprising alarm, INOP, aircraft status, air conditioning and anti-ice, runway, ATIS (Automatic Terminal Information Service), meteorological and/or NOTAM (Notice To Airmen) type.

5. The method according to claim 1, wherein the processing step further comprises one or more operations from among operations of interpretation, filtering and conversion of the extracted data.

6. The method according to claim 1, wherein the avionics data sources being transmitted by interface equipment of the aircraft from data arising from an FPS (flight planning system) and/or a CMS (centralized maintenance system).

7. The method according to claim 1, wherein the external data sources being transmitted by one or more ground servers and the external data comprising meteorological and/or NOTAM notices type data.

8. The method according to claim 1, wherein the external data sources furthermore comprising data arising from the Internet network.

9. The method according to claim 5, wherein the operation of interpreting the collected data being performed by means of an avionics protocols model.

10. The method according to claim 5, wherein the operation of converting the collected data being performed by means of a predefined conversion file.

11. The system according to claim 2, further comprising means for implementing:
    a reception of a correction or of the validation of one or more items of data by a pilot prior to the performance computation.

* * * * *

UNITED STATES PATENT AND TRADEMARK OFFICE
CERTIFICATE OF CORRECTION

PATENT NO. : 10,109,117 B2
APPLICATION NO. : 14/803042
DATED : October 23, 2018
INVENTOR(S) : François Fournier et al.

Page 1 of 1

It is certified that error appears in the above-identified patent and that said Letters Patent is hereby corrected as shown below:

In the Claims

In Claim 2, Column 10, Line 6, "a least one" should be -- at least one --.

Signed and Sealed this
Fourth Day of December, 2018

Andrei Iancu
*Director of the United States Patent and Trademark Office*